United States Patent
Lim et al.

(10) Patent No.: US 9,479,695 B2
(45) Date of Patent: Oct. 25, 2016

(54) GENERATING A HIGH DYNAMIC RANGE IMAGE USING A TEMPORAL FILTER

(71) Applicant: Apple Inc., Cupertino, CA (US)

(72) Inventors: Suk Hwan Lim, Mountain View, CA (US); D. Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 14/449,015

(22) Filed: Jul. 31, 2014

(65) Prior Publication Data

US 2016/0037060 A1   Feb. 4, 2016

(51) Int. Cl.
  *H04N 5/228* (2006.01)
  *H04N 5/232* (2006.01)
  *G06T 5/10* (2006.01)

(52) U.S. Cl.
  CPC ............ *H04N 5/23229* (2013.01); *G06T 5/10* (2013.01); *G06T 2207/20024* (2013.01); *G06T 2207/20182* (2013.01); *G06T 2207/20208* (2013.01)

(58) Field of Classification Search
  CPC ............... H04N 5/2355; H04N 19/98; H04N 5/23232; H04N 5/355; G06T 5/50
  See application file for complete search history.

(56) References Cited

U.S. PATENT DOCUMENTS

| | | | |
|---|---|---|---|
| 6,157,677 A | 12/2000 | Martens et al. | |
| 7,822,287 B2 | 10/2010 | Frank | |
| 7,881,387 B2 | 2/2011 | Han et al. | |
| 7,991,196 B2 | 8/2011 | Tener et al. | |
| 8,619,881 B2 | 12/2013 | Schoenblum | |
| 8,698,834 B2 | 4/2014 | Brown Elliott | |
| 2007/0014445 A1 | 1/2007 | Lin | |
| 2010/0045870 A1* | 2/2010 | Chao | 348/607 |
| 2011/0058050 A1* | 3/2011 | Lasang et al. | 348/208.4 |
| 2011/0090351 A1* | 4/2011 | Cote et al. | 348/208.1 |
| 2013/0038745 A1* | 2/2013 | Myokan | 348/208.99 |

(Continued)

FOREIGN PATENT DOCUMENTS

| | | |
|---|---|---|
| WO | 2013049412 | 4/2013 |
| WO | 2014074601 | 5/2014 |

OTHER PUBLICATIONS

U.S. Appl. No. 14/449,010, filed Jul. 31, 2014, D. Amnon Silverstein, et al.

(Continued)

*Primary Examiner* — Sinh Tran
*Assistant Examiner* — Selam T Gebriel
(74) *Attorney, Agent, or Firm* — Robert C. Kowert; Meyertons, Hood, Kivlin, Kowert & Goetzel, P.C.

(57) ABSTRACT

A temporal filter in an image processing pipeline may be configured to generate a high dynamic range (HDR) image. Image frames captured to generate an HDR image frame be blended together at a temporal filter. An image frame that is part of a group of image frames capture to generate the HDR image may be received for filtering at the temporal filter module. A reference image frame, which may be a previously filtered image frame or an unfiltered image frame may be obtained. A filtered version of the image frame may then be generated according to an HDR blending scheme that blends the reference image frame with the image frame. If the image frame is the last image frame of the group of image frames to be filtered, then the filtered version of the image frame may be provided as the HDR image frame.

20 Claims, 6 Drawing Sheets

(56) References Cited

U.S. PATENT DOCUMENTS

| | | |
|---|---|---|
| 2013/0070965 A1 | 3/2013 | Jang et al. |
| 2013/0094569 A1 | 4/2013 | Chong et al. |
| 2013/0266079 A1 | 10/2013 | Huang et al. |
| 2014/0003528 A1 | 1/2014 | Tourapis |
| 2014/0078347 A1 | 3/2014 | DeBattista |

OTHER PUBLICATIONS

U.S. Appl. No. 14/449,011, filed Jul. 31, 2014, Suk Hwan Lim, et al.

U.S. Appl. No. 14/449,016, filed Jul. 31, 2014, Suk Hwan Lim, et al.

* cited by examiner

GENERATING A HIGH DYNAMIC RANGE IMAGE USING A TEMPORAL FILTER

BACKGROUND

Image data captured by an image sensor is often initially processed as part of an image processing pipeline in order to prepare the captured image data for further processing or consumption. In this way, real-time corrections and/or enhancements can be made without consuming other system resources. For example, raw image data may be corrected, filtered, or otherwise modified to provide subsequent components, such as a video encoder, with appropriately scaled image data for encoding and subsequent display, reducing a number of subsequent operations to be performed on the image data at the video encoder.

In order to implement these corrections and/or enhancements for captured image data, various different devices, components, units, or other modules may be used to implement the varying operations performed as part of an image processing pipeline. An image signal processor, for instance, may include multiple different units or stages at which different image modifications or enhancements can be made to image data obtained from an image sensor. Given the ubiquity of image sensors in many different products, efficiently handling image data as part of an image processing pipeline may confer relief on those products with constrained resources for performing additional tasks.

SUMMARY

An image signal processor of a device, apparatus, or computing system that includes a camera capable of capturing image data may, in some embodiments, be configured to generate a high dynamic range (HDR) image from image data received from the camera's image sensor using blending techniques at a temporal filter. Generally, a stream of pixels of a captured image frame may be processed at the temporal filter in order to reduce image noise. The temporal filter may implement a blending technique to blend a reference image frame which may be a previously filtered image frame with the image frame. In order to generate an HDR image, the temporal filter may blend an image frame with a reference image frame, which may or may not be previously filtered at the temporal filter, according to an HDR blending scheme. As the number of different exposures to generate an HDR image may vary, the temporal filter may be configured to blend different numbers of image frames together in order to generate the HDR image. In addition to the HDR blending scheme, various different temporal filtering techniques may be implemented to improve the quality of the blending between image frames captured to generate an HDR image, such as motion estimation and compensation, spatial filtering, and noise history blending adjustments.

Figure 1:
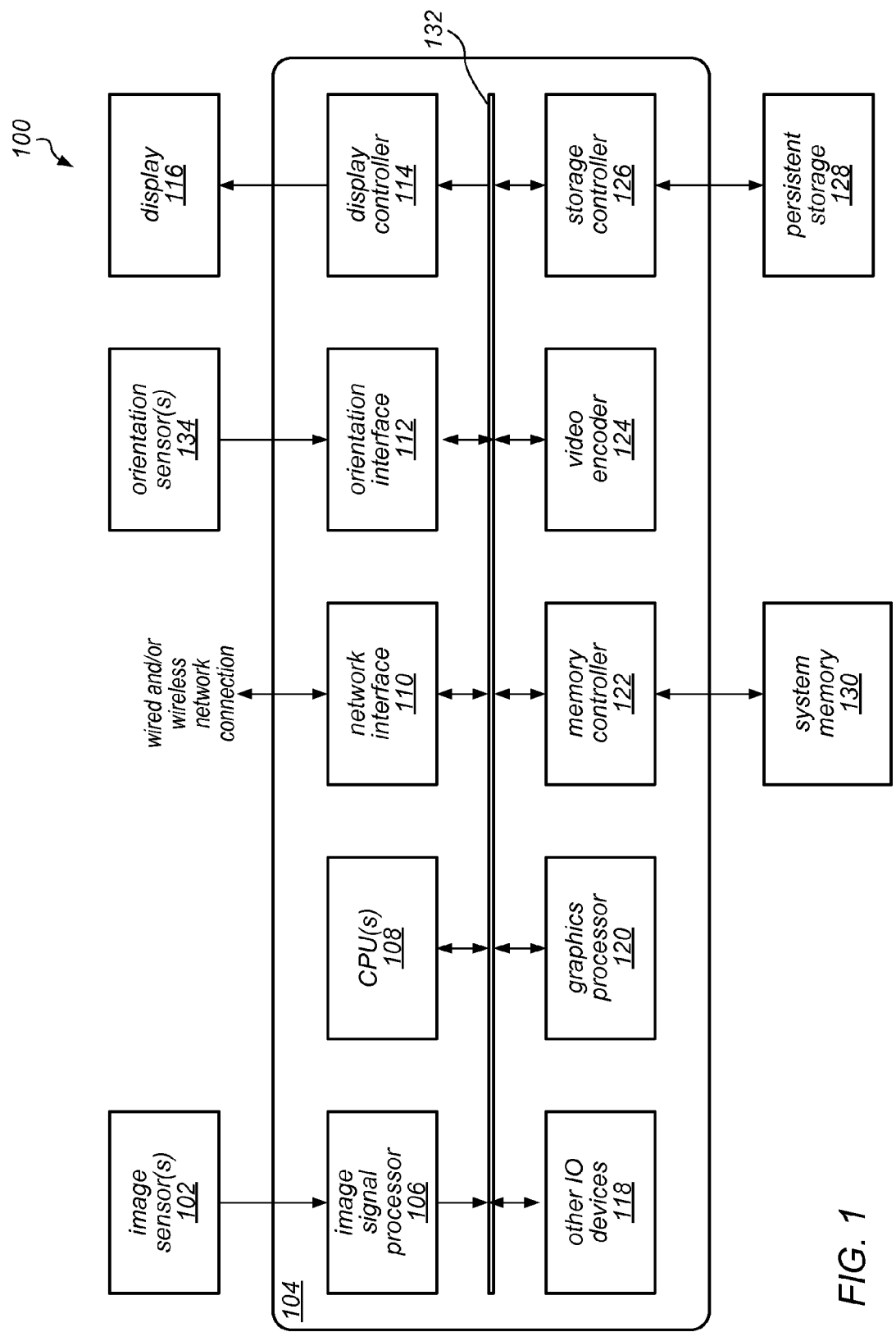
FIG. 1 is a logical block diagram illustrating an example system that may implement an image processing pipeline that generates an HDR image at a temporal filter, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An image signal processor or other image processing pipeline may implement many different techniques and/or components to correct or enhance image data captured by an image sensor. In various embodiments, temporal filtering may perform noise filtering on image data. Temporal filtering is based on filtering the pixel values of a current image frame captured at an image sensor using pixel values of a previously filtered image frame. Pixel values from another image frame, which may or may not be previously filtered and is referred to herein as the reference image frame, may be combined with the pixel values of the current image frame to get a best estimate of the pixel values with reduced noise. Over time, as more image frames are filtered at the temporal filter, a reference image frame may provide a higher quality image with less noise.

High dynamic range (HDR) images may be produced to provide a greater range of luminance in a single image than may be captured by any one exposure level at a particular image sensor, such as a camera, at a time. Typically image sensors may capture image data of a subject within a limited exposure range, which may leave out details in areas of the subject exposed to different levels of light than may be captured within the exposure range. For instance, if a subject is captured in images at three different exposure levels, low, medium, and high, then different details of the subject may be included and/or more visible in one of the images, rather than the other images with different exposure levels. In an HDR image, the different details captured by the different exposure levels of the three images may be blended together to create a higher exposure range for the blended image and thus, a higher level of detail displayed for the subject.

For image processing pipelines capable of capturing image data at different exposure levels, a temporal filter module implemented as part of the image processing pipeline may be configured to generate HDR images using temporal filtering techniques. In this way, a fast, low-power technique may be provided to generate HDR images. Moreover, as temporal filtering may be performed in raw image formats (e.g., image frames formatted according to a Bayer image filter), more image data may be preserved. Noise filtering performed when blending the image frames at the temporal filter may allow other image processing techniques to be performed more aggressively (e.g., tone mapping) due to lower image noise.

In various embodiments, an image frame may be received for filtering at a temporal filter module that is one of a set of image frames captured (or to be captured) for generating an HDR image frame. A set of image frames may include two or more image frames that are captured at different exposure levels at an image sensor. The reference image frame maintained for the image filter may be obtained (e.g., from memory or some other buffer). The reference image frame may be a previously filtered image frame (e.g., processed according to the various techniques implemented at a temporal filter, which may include blending the previous image frame with other image frames in the set of image frames captured to generate the HDR image frame). In some embodiments, the reference image frame may be an unfiltered image frame (e.g., which may have been captured and stored to system memory). A filtered version of the image frame may then be generated, blending the image frame with the reference image frame according to an HDR blending scheme. An HDR blending scheme may, in various embodiments, blend the two image frames to maximize the detail in the filtered version of the image frame as may be provided by the varying exposures encompassed in the two image frames. For example, detail provided by an image frame with low exposure acting as a reference image frame may be given a higher blending ratio or weight with respect to an image frame with a medium or high exposure level. The filtered version of the image frame may then be provided as an HDR image, either to a memory or other storage location, or to further image processing pipeline components for further processing.

The techniques described herein for performing temporal filtering to generate an HDR image may be further illustrated in terms of an example system that employs them. As noted above, these techniques may be implemented in any type of camera, apparatus, or computing system that includes the capability to capture and process image data, including video clips.

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes an image sensor 102, a system-on-a chip (SOC) component 104, system memory (e.g., DRAM) 130, persistent storage (e.g., flash memory) 128, and a display 116 (e.g., LCD). In this example, image sensor 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. In this example, display 116 may be configured to display a preview of captured still images and/or video clips. Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 and/or SOC component 104 may include more or fewer elements than those shown in FIG. 1.

In various embodiments, SOC component 104 may be a uniprocessor system including one processor, or a multiprocessor system including several processors (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, superpipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data and/or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, and/or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, and/or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available. In some embodiments program instructions stored in system memory 130 may be executed by CPU 108 and/or GPU 120 to provide various functions of system 100.

In other embodiments, various functions may be performed by software components executing in memory on another device and communicating with the illustrated system via inter-computer communication. Some or all of these software components and/or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network and/or a wireless link. Various embodiments may further include receiving, sending or storing instructions and/or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
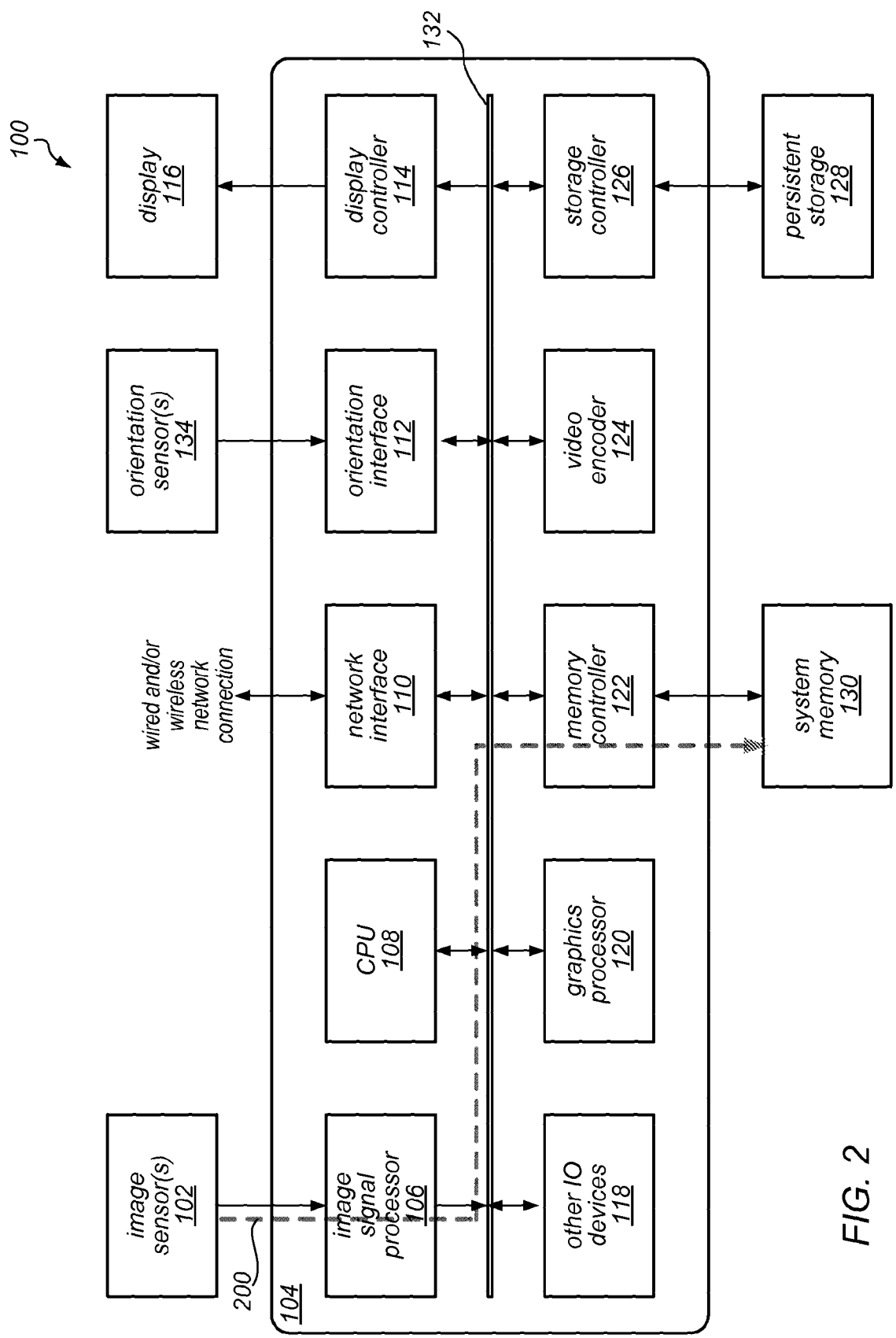
FIG. 2 is a logical block diagram illustrating an example data path in a system that may implement an image processing pipeline that generates an HDR image at a temporal filter, according to some embodiments.

FIG. 2 is a block diagram illustrating a data path in a system that implements an image signal processor (specifically, in system 100 illustrated in FIG. 1), according to some embodiments. As illustrated by the dashed lines in this example, image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

In some embodiments graphics processor 120 may access, manipulate, transform and/or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, and/or display controller 114) without storing the image data to system memory 130.

Figure 3:
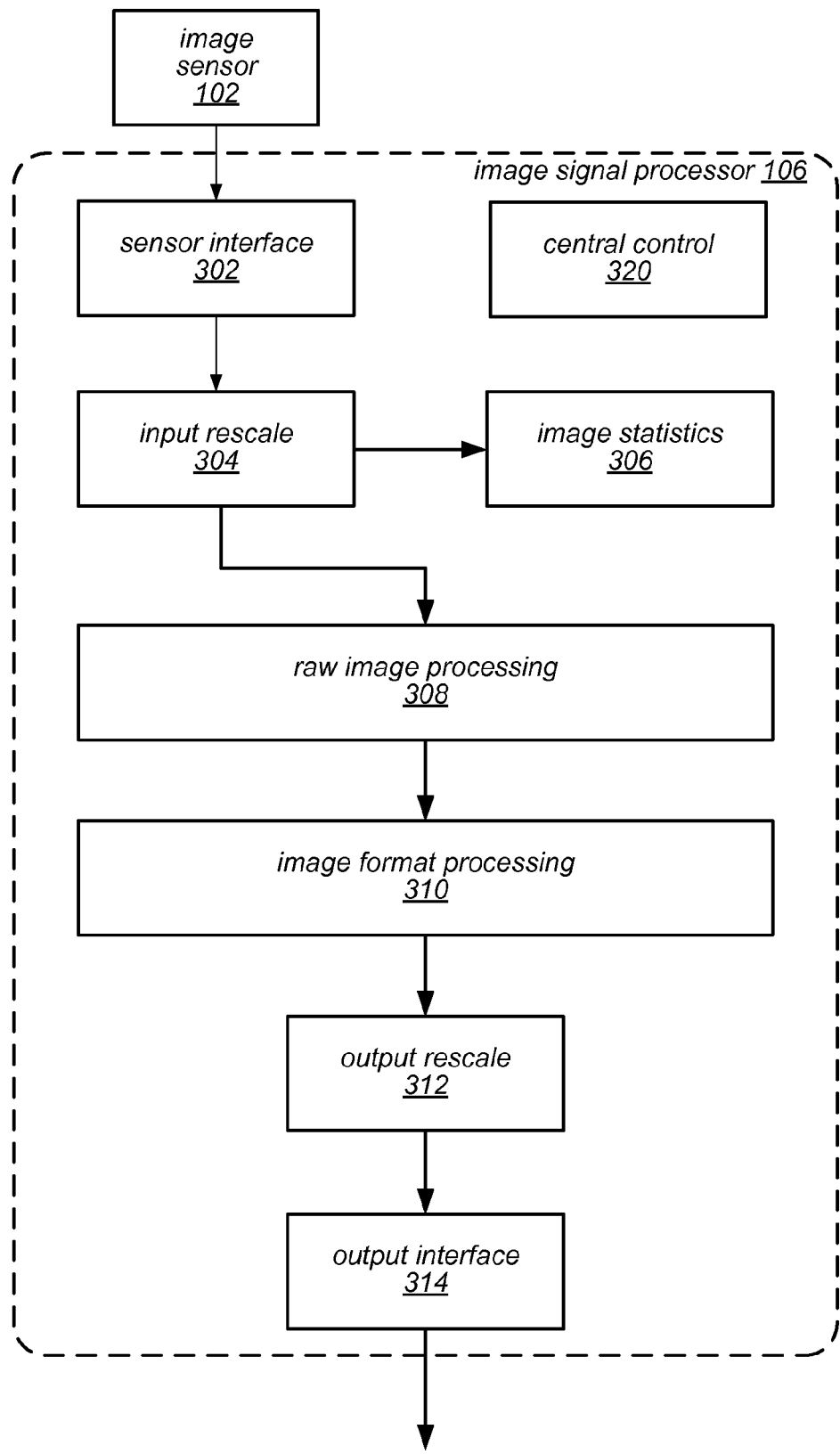
FIG. 3 is a logical block diagram illustrating an example image signal processor, according to some embodiments.

One embodiment of an image signal processing unit (ISP), such as image signal processor 106, is illustrated by the block diagram in FIG. 3. As illustrated in this example, ISP 106 may in various embodiments be coupled to an image sensor 102 (from which it receives image data). In this example, ISP 106 implements an image pipeline, i.e., a set of stages that process image information from creation (or capture) to output. For example, the various elements illustrated as components of ISP 106 process source data received from image sensor 102 through sensor interface 302 into image data usable by other stages in the pipeline (e.g., input rescale 304, image statistics 306, raw image processing 308, image format processing 310 or output rescale 312), by other components of a system that includes ISP 106 via output interface 314 (including those that access the transformed data from the system memory after it is written to the system memory via memory controller interface 122 or are provided the image data via interconnect 132 directly), and/or by other devices coupled to the system that includes ISP 106. Note that in some embodiments, the image signal processor 106 is a streaming device. In other words, pixels may be received by the image signal processor 106 from the image sensor 102 in raster order (i.e., horizontally, line by line) and may in general be processed through its various pipeline stages in raster order, until finally being output in raster order.

In various embodiments, image signal processor 106 may implement central control module 320. Central control module 320 may configure and start the processing of image data, in some embodiments. For example, central control module may implement performance monitors for logging clock cycles, memory latency, quality of service, and state information. Central control module 320 may update or manage control parameters for units, modules, stages, and/or other components of ISP 106, and may interface with sensor interface 302 to control the starting and stopping of the of the units, modules, stages, and/or other components. For example, in some embodiments, a unit, module, stage, and/or other component may go into an idle state during which programmable parameters may be updated by central control module 320. The unit, module, stage, and/or other component may then be placed into a run state, to perform one or more operations or tasks. In some embodiments, some portions, components or units of the module may be disabled or skipped when processing certain image frames. For example, in some embodiments, different units may be enabled or disabled when processing image frames captured to generate an HDR image. If, for instance, a first image frame for generating an HDR image is captured at image sensor 102 (e.g., a long exposure time), then after initially receiving the image via sensor interface 302, the image frame may be stored in memory (e.g., system memory 130 in FIG. 1). For a next image frame for captured for generating the HDR image, raw image processing unit 308 may be enabled, including performing the techniques illustrated below in FIGS. 4-6 for temporal filtering the image frame using the previous image frame as a reference image frame.

In the illustrated embodiment, ISP 106 may implement input rescale module 304. Input rescale module 304 may downscale full-resolution sensor images to a different resolution (e.g., video resolution) early in the image processing pipeline, which may reduce the power and bandwidth cost of image processing at later states, units, and/or modules of ISP 106, as well as for providing different image resolutions. In some embodiments, input rescale module 304 may perform various functions of other units or modules in the image processing pipeline. For example, in some embodiments, input rescale module 304 may perform a first-pass demosaic of Bayer image data received from image sensor 102, resampling, and then re-mosaicing the image data for the remainder of the image processing pipeline. Input rescale module 304 may handle pixel defects and filtering around highlight regions, such as performing defective pixel correction and performing a highlight-recovery pass. Input rescale module may also convert the image data between different color models, spaces or formats (e.g., RGB or YCbCr), as well as perform specialized color format techniques to correct/enhance raw image data (e.g., chrominance suppression in YCbCr).

In various embodiments, image signal processor 106 may implement image statistics module 306. Image statistics module 306 may perform various functions and collect information. For example image statistics module may, in some embodiments may perform sensor linearization, defective pixel replacement, black level compensation, lens shading correction, and inverse black level compensation, collecting image information as a result of the various operations. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting.

In various embodiments image signal processor 106 may implement raw image processing module 308. Raw image processing module 308 may, in various embodiments implement a variety of modules, units, and/or components to perform various operations, functions, or tasks on raw image data (e.g., Bayer format), in different orders, such as sensor linearization, black level compensation, fixed pattern noise reduction, temporal filtering, defective pixel correction, spatial noise filtering, lens shading correction, white balance gain, highlight recovery, and/or raw scaling. A sensor linearization unit may, in some embodiments, map non-linear image data to linear space. Black level compensation may be performed to provide digital gain, offset and clip independently for each color component (e.g., Gr,R,B,Gb) on the pixels image data (which may occur after sensor linearization). Fixed pattern noise reduction may be performed to remove offset fixed patter noise and gain fixed pattern noise by subtracting a dark frame from an input image and multiplying different gains to pixels, in some embodiments. Temporal filtering may perform noise filtering based on pixel values from previous image frame. Defective pixel correction may determine or identify defective pixels, and may replace defective pixel values. Spatial noise filter may reduce noise in image data by averaging neighbor pixels that are similar in brightness. Lens shading correction may apply a gain per pixel to compensate for a dropoff in intensity roughly proportional to a distance from a lens optical center. White balance gains may provide digital gains for white balance, offset and clip independently for all color component Gr,R,B,Gb. Highlight recovery may estimate pixel values for those pixels that are clipped (or nearly clipped) from other channels. Raw scaling may scale down image data in a raw format (e.g., Bayer format). Please note that various examples and descriptions provided above are not intended to be limiting as to the various techniques, components, or formats of raw image data implemented as part of raw image processing, but are instead merely provided as examples.

As noted above, in at least some embodiments, a temporal filter module, unit, or component may be implemented as part of raw image processing module 308, such as temporal filter module 400 described below with regard to FIG. 4. The temporal filter may perform noise filtering based on pixel values from a reference image frame. In some embodiments, the temporal filter may introduce a frame delay into the image processing pipeline of ISP 106 by providing the reference image frame instead of the current image frame. The frame delay may allow downstream processes, units, stages, or components time to gather more information for better analysis of image data, as well as allow downstream processes to be programmatically tailored to the image data. In various embodiments, the temporal filter may perform filtering based on a generated blending value for each pixel on a current image frame that is based on differences determined between neighboring pixels in the current image frame and a reference image frame. In some embodiments, the temporal filter may adjust blending values for pixels based on noise history maintained for the pixels, luminance, and/or radial factor. In some embodiments, the temporal filter may implement dynamic motion estimation and compensation for image data as it is received on the fly, so that a reference image frame may be shifted to align with a current frame before filtering. In some embodiments, the temporal filter may be configured to generate an HDR image frame, blending one or more captured image frames according to an HDR blending scheme.

In various embodiments, image signal processor 106 may implement image format processing module 310. Image format processing module 310 may, in various embodiments implement a variety of modules, units, and/or components to perform various operations, functions, or tasks, in different orders, such as demosaicing raw image data to RGB image format, local tone mapping, determining gain/offset/clip, color correction, 3D color lookup, RGB gamma mapping, color space conversion (e.g., to YCbCr), statistics collection, luma sharpening, chroma suppression, dynamic range compression, brightness, contrast and color adjustments, YCbCr gamma mapping, chroma decimation and chroma noise reduction. Demosaicing may interpolate missing color samples in image data. Local tone mapping may apply spatially varying local tone curves to image data. Gain, offset, and clip may be determined for each color component in RGB image data. Color correction may be performed using an RGB color correction matrix. RGB gamma mapping may provide a mapping between RGB values using a lookup table for gamma correction. Color space conversion may convert image data to another color format or space (e.g., RBG to YCbCr). Luma sharpening may sharpen luma values. Chroma suppression may attenuate chroma to gray (i.e. no color). Noise in chrominance channels may be filtered. Please note that various examples and descriptions provided above are not intended to be limiting as to the various techniques or components implemented as part of image format processing, but are instead merely provided as examples.

In various embodiments, image signal processor 106 may implement output rescale module 312. Output rescale module 312 may resample, transform and correct distortion on the fly as the ISP 160 processes image data. Output rescale module 312 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing and/or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 312 may, in various embodiments, apply transforms to image data as it is processed at output rescale module 312. Output rescale module 312 may include horizontal and vertical scaling components. The vertical portion of the design may implement series of image data line buffers to hold the "support" needed by the vertical filter. As ISP 106 may be a streaming device, it may be that only the lines of image data in a finite-length sliding window of lines are available for the filter to use. Once a line has been discarded to make room for a new incoming line, the line may be unavailable. Output rescale module 312 may statistically monitor computed input Y coordinates over previous lines and use it to compute an optimal set of lines to hold in the vertical support window. For each subsequent line, output rescale module may generate a best guess of where to center the vertical support window automatically. In some embodiments, output rescale module 312 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame.

Note also that, in various embodiments, the functionally of units 302-314 may be performed in a different order than the order implied by the order of these functional units in the image processing pipeline illustrated in FIG. 3, or may be performed by different functional units than those illustrated in FIG. 3. Moreover, the various components, units, processes, or other functionalities described in FIG. 3 (or subsequent FIGS. 4-6) may be implemented in various combinations of hardware and/or software.

As noted above, in various embodiments a temporal filter may be implemented as part of an image processing pipeline in an image signal processor, such as image signal processor 106, described above with regard to FIG. 3. A temporal filter may perform noise filtering based on pixel values from a previously filtered image frame. Pixel values from the previously filtered image frame (which may be referred to herein as the reference image frame), may be combined with pixel values of a current image frame to get a best estimate of the pixel values. For example, the temporal filter may average the pixel values in the current image frame and the corresponding pixels in the reference image frame when the current image frame and the reference image frame are similar. In another example, when the pixels of the current image frame and the corresponding pixels of the reference image frame are significantly different (e.g., due to camera motion or object movement in the scene), filtering strength that blends the reference image frame with the current image frame may be reduced (e.g., to avoid trailing or ghosting artifacts). In at least some embodiments, the temporal filter may be adaptive through programmatic (e.g., software) controls based on brightness and/or radial pixel location. FIG. 4 is a logical block diagram illustrating a temporal filter that may be implemented as part of an image processing pipeline, according to some embodiments.

Temporal filter 400 may be a module or component implemented as part of an image processing pipeline, such as image signal processor 106 illustrated above in FIG. 3. In at least some embodiments, temporal filter 400 may be implemented as part of raw image processing unit 308. In some embodiments, temporal filter module 400 may receive image data (e.g., pixels) that has been processed at one or more proceeding components implemented within raw image processing unit 308. For example, in some embodiments, other filters or correction components, such as sensor linearization, black level compensation, and/or fixed noise pattern modules may process image data and provide that image data to temporal filter module 400.

The image data provided to temporal filter 400 may, in some embodiments, be implemented as raw image data (e.g., the same image data format as provided directly to the image signal processor from an image sensor). There may be many different types of raw image data formats, which may include different sizes or configurations of image information for a pixel value (e.g., different MIPI-CSI data types or different image sensor configurations such as different Bayer filters). Current image frame 404 may be image data (e.g., pixels) of a current image that are received at temporal filter 400 in order to generate a filtered version of the pixels as part of generating a filtered version of the current image frame being processed (e.g., live image data from the image sensor or stored image data in a memory/buffer). For instance, current image frame 404 may illustrate individual Bayer pixels of a current image frame in Bayer format that are received for filtering. Please note, as discussed above, image data at temporal filter 400, as well as other components of image signal processor 106 may be processed on a per pixel basis, such that a stream of individual pixels are received for filtering individually at temporal filter 400.

Reference image frame 402 may be image data (e.g., pixel values) stored as part of a reference image frame that was previously filtered at temporal filter 400. Reference image frame 402 may be received from a buffer or memory maintaining the image data for the reference image frame. Reference image frame 402 may be a same type of image data format as current image frame 404 (e.g., Bayer pixels). In some embodiments, a reference image frame may be used as a reference image frame without previously being filtered.

Although not illustrated, in some embodiments, if differences in exposure or changes in lighting occur between reference image frame 402 and current image frame 404, it may be advantageous to adjust the brightness of the image data for the two frames so that the differences in exposure or changes in lighting do not adversely affect various analysis, modifications, or other components of temporal filter 400 with respect to the two frames. A respective normalization component may be implemented to adjust the gain and black level for the reference image frame 402 and/or the current image frame 404 respectively. For example, reference image frame 402 may be 10% brighter than the current image frame 404 (e.g., which can happen when the exposure is changing between the frames due to a function like auto-exposure trying to expose the image sensor optimally). If the brightness is different, motion estimation and compensation component 410 may give an erroneous result since the motion estimation algorithm may assume brightness is constant along the motion trajectory. In another example of adverse effect, if the brightness of reference image frame 402 and current image frame 404 does not match, a higher number of pixels in the current image frame 404 would be considered different enough than the reference image frame causing spatially-based filter generator 420 to generate a filter that effectively "turns down" the filtering strength for the reference image frame 402. These and other adverse effects would reduce the quality of the filtering at temporal filter 400 (e.g., when there is only a global brightness difference between the two frames).

Normalization of brightness may be performed by compensating for the exposure differences that may be derived from the differences in exposure times and sensor gains, in various embodiments. For example, current image frame 404 may be scaled based on a set of gain and offset values.

Similarly, reference image frame 402 may be scaled based on a separate set of gain and offset values. Brightness normalization may, in various embodiments, allow for temporal filter module to accurately blend different image frames in order to generate an HDR image.

In some embodiments, reference image frame 402 and current image frame 404 may be provided to motion estimation and compensation component 410. Motion estimation and compensation component 410 may estimate motion between the reference image frame 402 and the current image frame 404. The estimated motion may then be used to locally shift the reference image frame 402 such that the shifted frame is better aligned to the current image frame 404. Motion estimation and compensation component 410 may be configured to perform motion compensation dynamically without access to the entirety of both of the reference image frame 404. Thus, warped reference image frame 412 may be provided to spatially-based filter generator 420 and filtered image frame generator 440.

Temporal filter 400 may blend the warped reference image frame 412 and the current image frame 404. The blending (or mixing) ratio may vary from pixel to pixel based on how similar a given pixel in the current image frame 404 is compared to a corresponding pixel in the warped reference image frame 412. Spatially-based filter generator 420 may be configured to determine the difference between a given pixel in the current image frame 404 and the corresponding image pixel in the warped reference image frame 412 based on pixels in the current image frame 404 neighboring the given pixel in the current image frame 404, and the corresponding pixels of those neighboring pixels in the warped reference image frame 412. A filter weight 422 may be generated that can be applied to blend the given pixel of the current image frame 404 with the corresponding pixel of the warped reference image frame 412. For example, if the given pixel in the current image frame 404 is similar to a pixel value in the reference frame, then the corresponding pixel of the warped reference image frame 412 pixel may get the majority of the weight in the filtered version of the given pixel.

The generated filter 422 may, in some embodiments, be provided to historically-based filter adjustment component 430. Historically-based filter adjustment component 430 may modify the filter 422 based on noise history maintained for the corresponding pixel of the warped reference image frame 412. Modified filter 432 may be provided to filtered image frame generator 440, which may blend the corresponding pixel of warped reference image frame 412 with the given pixel of current image frame 404 according to the modified filter 432 to generate a filtered version of the given pixel. For example, modified filter 432 may be represented as a value k, which may be used to determine the proportions of the corresponding pixel of warped reference image frame 412 and the given pixel of current image frame 404 to be blended. If k=0.7, then 70% of the filtered version of the given pixel may be from the corresponding pixel in warped reference image frame 412 and 1−k (0.3 or 30%) of the filtered version of the given pixel may be from the given pixel of the current image frame 404. The filtered version of the given pixel may be sent to the reference frame buffer 444 (e.g., written to system memory) to be maintained as part of a filtered version of the current image frame 404, which may be provided as reference image frame 402 for the next current image frame 404 received at temporal filter 400.

In some embodiments, frame output selection component 450 may be implemented as part of temporal filter 400, which may determine whether to provide filtered image frame 442 or reference image frame 402 (not warped) to a downstream unit or component in the image processing pipeline as output image frame 452 (e.g., a component downstream in raw image processing unit 308, image format processing unit 310, output rescale unit 312, and/or output interface 314. Providing the reference frame image 402 may introduce a frame delay into the image processing pipeline, which may be utilized to programmatically configure a component downstream in the image processing pipeline. Frame output selection component 450 may determine which image frame to provide based on a frame delay selection 406, whether delay is enabled or disabled.

Figure 4:
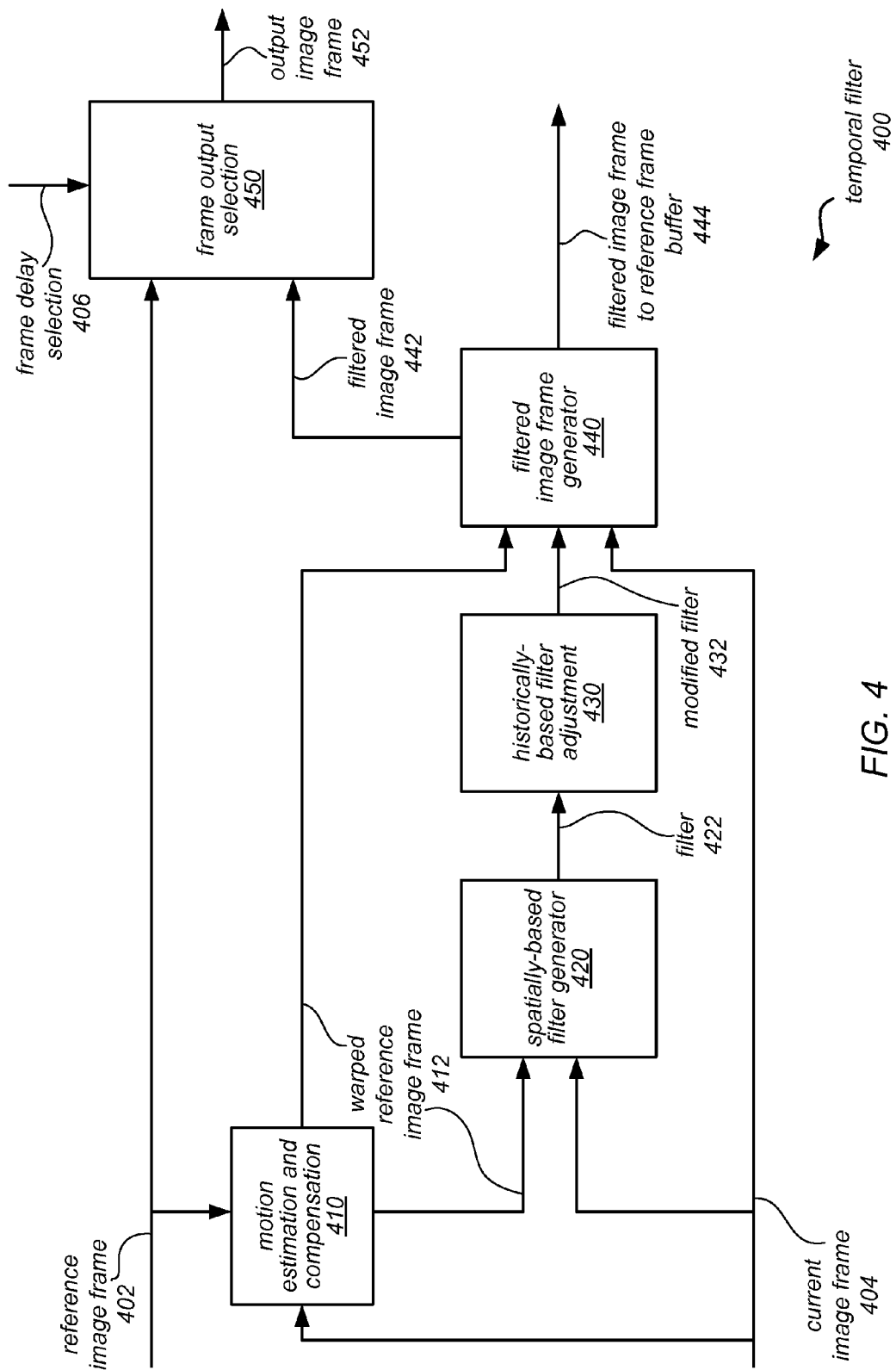
FIG. 4 is a logical block diagram illustrating a temporal filter that may be implemented as part of an image processing pipeline, according to some embodiments.

Please note that FIG. 4 is provided as merely an example of a temporal filter. Different combinations of the illustrated components (as well as components not illustrated) may be used to perform temporal filtering. For example, in some embodiments frame output selection component 450 may not be implemented. Similarly, in some embodiments, motion compensation and estimation component 410 may not be implemented. In some embodiments, spatially-based filter generator 420 may be implemented while historically-based filter adjustment module 430 may not be implemented, or conversely historically-based filter adjustment module 430 may be implemented while a different type of filter generator (e.g., a filter generator that determines pixel difference based on a given pixel and corresponding pixel alone) may be implemented. Various components of temporal filter 400 may be enabled or disabled for filtering specific image frames, in some embodiments. Thus, the components of FIG. 4 and their respective layout or ordering is not intended to be limiting to the various other combinations which may be used to implement temporal filter 400. Moreover, the image data processed at the temporal filter may be in many different color spaces, and as such may not be limited Raw or Bayer color format.

Figure 5:
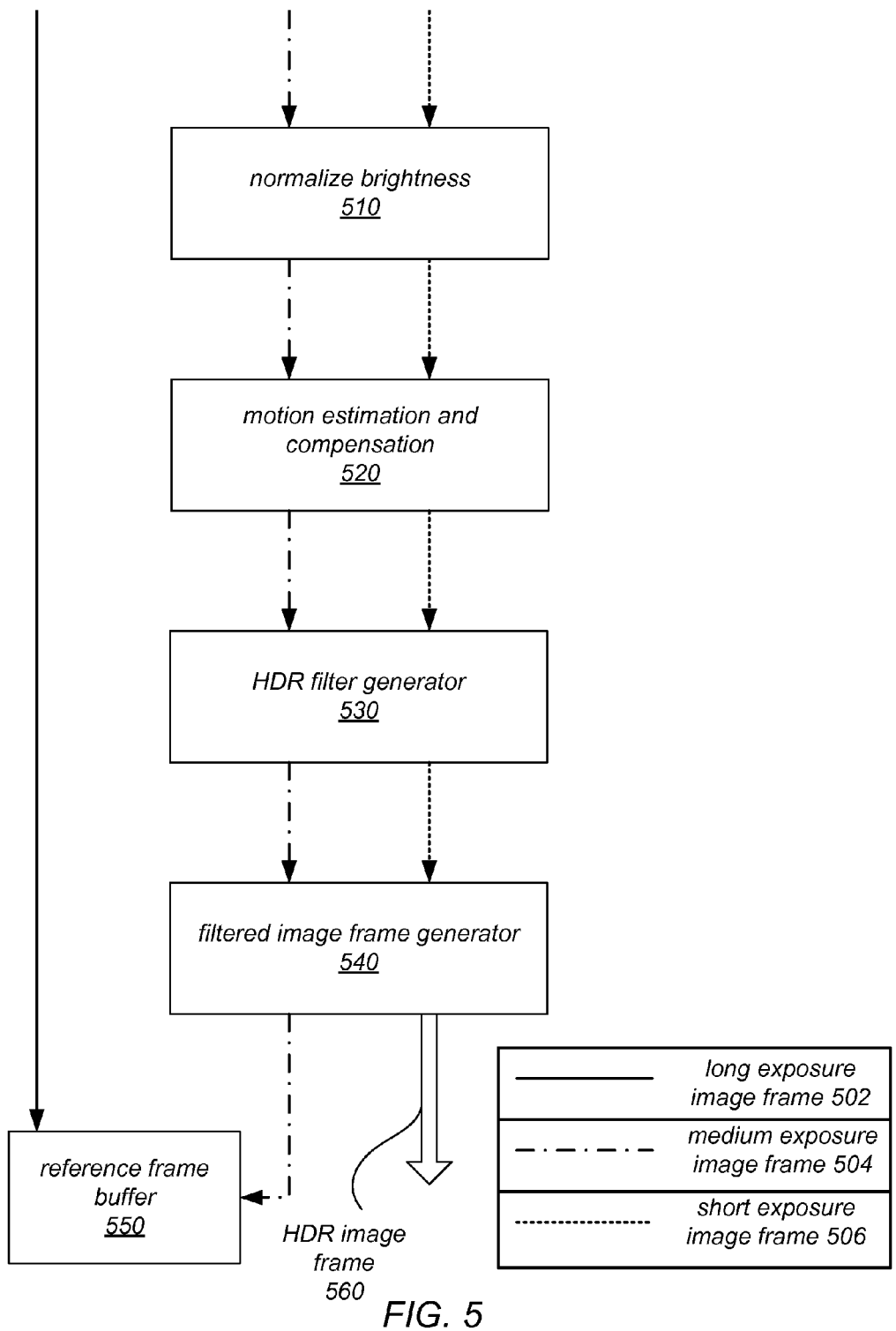
FIG. 5 is a data flow diagram illustrating the generation of an HDR image for multiple image frames captured to generate the HDR image at a temporal filter, according to some embodiments.

As noted above, a temporal filter may be used to generate an HDR image from different image frames at different exposure levels, captured to generate the HDR image. FIG. 5 is a data flow diagram illustrating the generation of an HDR image for multiple image frames captured to generate the HDR image at a temporal filter, according to some embodiments. In FIG. 5, three different image frames with correspondingly different exposure levels are utilized at the temporal filter. Long exposure frame 502 may, in some embodiments, be the first image frame captured for generating the HDR image. As illustrated by the solid arrow in FIG. 5, long exposure frame 502 may be stored in reference frame buffer 550 (which may be implemented in system memory 130 in FIG. 1). Long exposure frames may generally have less noise than image frames captured with short exposures and thus, in some embodiments, may be stored in reference frame buffer 550 bypassing other filtering components of a temporal filter. However, in other embodiments temporal filtering or other image modification/optimization techniques may be performed on long exposure image frame 502 prior to storage in reference image frame buffer 550.

Image data for a next image frame may be captured for generating the HDR image, medium exposure image frame 504 may be received at a temporal filter for filtering. As illustrated by the dash-dot arrows, in some embodiments medium exposure image frame 504 may first have brightness normalized or adjusted, as indicated at 510. The brightness values of the pixels in medium exposure image frame 504 may be normalized with respect to long exposure image frame 502 (which may also be normalized). For example, as discussed above with regard to FIG. 4, the brightness values of pixels for image frame 504 may be scaled based on a set of gain and offset values for image frame 504.

Medium exposure image frame 520 may then be used to perform motion estimation and compensation 520 for determining a motion estimate between medium exposure image frame 504 and long exposure image frame 502. The motion estimate may be dynamically determined, registering long exposure image frame 502 with respect medium exposure image frame 504 as a live stream of pixels for medium exposure image frame 504 may be received at the temporal filter. For example, in some embodiments, a vertical motion estimate may be determined for the reference image frame with respect to the row of pixels in the current image frame and a horizontal motion estimate may be calculated for the reference image frame with respect to the row of pixels in the current image frame. Based, on the vertical and horizontal motion estimates determined as a row of pixels for the current image frame is received, a dynamic determination of a motion estimate may be performed on-the-fly for live image data as it is received from the image sensor (via other units, modules and/or components in the image processing pipeline). The motion estimate may be represented, in some embodiments, as a motion vector which indicates a two dimensional (horizontal and vertical) motion between long exposure image frame 502 with respect to a row of pixels in medium exposure image frame 504. Once determined, long exposure image frame 502 may be aligned with the row of medium exposure image frame 504 according to the motion estimate. Alignment may be performed in many different ways, performing various kinds of alignment and/or warping techniques. Mapping and resampling techniques, for instance, may be used to determine pixel values at the new pixel locations for long exposure image frame 502, in some embodiments.

In various embodiments, HDR filter generator 530 may be used to determine respective filters for each pixel medium exposure image frame 504, to blend medium exposure image frame 504 with long exposure image frame 502. For example, filter weights may generated that indicate a ratio of image data to blend from the reference image frame, long exposure image frame 502, with medium exposure image frame 504. The filters may be generated according to an HDR blending scheme. The HDR blending scheme may be implemented to obtain details (which may only be obtained or more clearly obtained) from each image frame, blending the details together to create an image frame with a higher exposure range. For example, for those "dark" areas of low light, more (or all) of the longer exposed image frame (e.g., long exposure image frame 502) may be used in the blended image frames. Conversely, for those "bright" areas of high light levels, more (or all) of the shorter exposed image frame (e.g., medium exposure image frame 504) may be used. In some embodiments, threshold values for brightness may determine that the entire value of the reference image frame (e.g., long exposure image frame 502) or the entire value of the current image frame (e.g., medium exposure image frame 504) may be used.

As illustrated in FIG. 4 above, in some embodiments various spatial filtering techniques and noise history modifications may be used to determine the filters and adjust the filters used for blending. A filter for blending a pixel with a corresponding pixel in a reference image frame may, for example, be determined based, at least in part, on a difference between neighboring pixels of the pixel in the current image frame and corresponding pixels in the reference image frame neighboring the corresponding pixel. Thus, for a given pixel of medium exposure image frame 504, the difference between neighboring pixels of the given pixel and corresponding pixels in long exposure image frame 502 may be determined. One or more spatial filtering techniques, in some embodiments, may be applied to the calculated difference between neighboring pixels of the given pixel in the current image frame and the reference image frame. The filtered difference value of the given pixel may be interpolated to identify a filter according to the HDR blending scheme.

In some embodiments one or more lookup tables may be implemented as part of implementing an HDR blending scheme. A lookup table may be configured (e.g., programmatically) based on different brightness levels (e.g., one, three or five brightness levels), which may be used to provide a filter for blending image frames to capture a higher range of exposure for the HDR image. When one brightness level is used, for example, the lookup table may be used as a 1D table and the filter may be linearly interpolated based on the lookup table index. When three brightness levels are used, in another example, three lookup tables consecutively indexed (e.g., from 0-64, 65-129 and 130-194) may be used to represent brightness levels 0, maximum brightness/2, and maximum brightness, respectively. When five brightness levels are used, in another example, five lookup tables consecutively indexed (e.g., from 0-64, 65-129, 130-194, 195-259 and 260-324) may be used to represent brightness levels 0, 0.25*maximum brightness, 0.5*maximum brightness, 0.75*maximum brightness and maximum brightness, respectively. The filter may be linearly interpolated based on lookup table index for the tables that correspond to the brightness above and below the determined brightness for a given pixel (e.g., of medium exposure image frame 504), and then linearly interpolated between the interpolated lookup table results based on the determined brightness. In scenarios where the determined brightness is above the maximum brightness, a clip value may be used instead of the lookup table.

In some embodiments, the filter for a pixel may be adjusted according to a noise history maintained for the corresponding pixel in the reference image frame (e.g., long exposure image frame 502). For example, in some embodiments, the filter may be modified according to a quality score indicating noise history maintained for the corresponding pixel of the reference frame image. The noise history may provide a ratio of the noise variance in the reference image frame to the noise variance in the current image frame (e.g., variance between long exposure image frame 502 and medium exposure image frame 504). The filter weight may be adjusted based, at least in part, on the quality score so that the higher the quality score the more reliable the reference image frame may be for noise reduction, while the lower the quality score the less reliable the reference image frame may be for noise reduction. For example, even if a determined filter weight indicates that a greater portion of the corresponding pixel of the reference image frame is to be used for blending, a low quality score may reduce the portion of the corresponding pixel used for blending. In some embodiments, the quality score may be a scalar value that may be applied to a determined filter weight.

A filtered version of medium exposure image frame 504 may be generated according to the respective filters generated for the pixels of medium exposure image frame 504, blending the pixels with corresponding pixels of long exposure image frame 502. For example, for a given pixel of medium exposure image frame 504, the given pixel and the corresponding pixel of long exposure image frame 502 may be blended according to the filter to generate a filtered version of the pixel as part of a filtered version of the medium exposure image frame 504. The filter may, for instance, may be represented as a mixing ratio or weight k, where k portion of long exposure image frame 502 and 1−k portion of medium exposure image frame 504 are blended together, and where 0≤k≤1. If, for instance, k=0.3, then the pixel value of the corresponding pixel in the long exposure image frame 502 (e.g., 25) may be multiplied by 0.3, equaling 7.5, and where the pixel value of medium exposure image frame 504 (e.g., 27) may be multiplied by 0.7, equaling 18.9. Thus, the value of the filtered version of the pixel may be 26.4. Please note, that the previous example of blending is not intended to be limiting as various other filter weight representations and blending techniques may be implemented. The filtered version of the pixel may be stored in reference frame buffer 550 as part of the filtered version of medium exposure image frame 504 as new reference image for filtering a subsequent image frame, short exposure image frame 506, in some embodiments.

As illustrated in FIG. 5, short exposure image frame 506, represented by a dotted arrow, captured as a last image frame to generate the HDR image, may be similarly filtered at a temporal filter with the filtered version of medium exposure image frame 504 (including image data from long exposure image frame 502) serving as the reference image frame. Thus, short exposure image frame 506 may have brightness values normalized 510 with respect to the filtered version of medium exposure image frame 504. Motion estimation and compensation 520 may be performed to align the filtered version of medium exposure image frame 504 with short exposure image frame 506, in some embodiments. A filter for blending short exposure image frame 504 and the filtered version of medium exposure image frame 504 may then be generated 530 according to an HDR blending scheme. Then a filtered version of short exposure image frame 506 may be generated 540, blending the pixels of short exposure image frame 506 with corresponding pixels of the filtered version of medium exposure image frame 504. As short exposure image frame 506 is the last image frame captured and received for filtering at a temporal filter, the filtered version of the short exposure image frame 506 may be provided as the HDR image frame 560 for subsequent processing.

Figure 6:
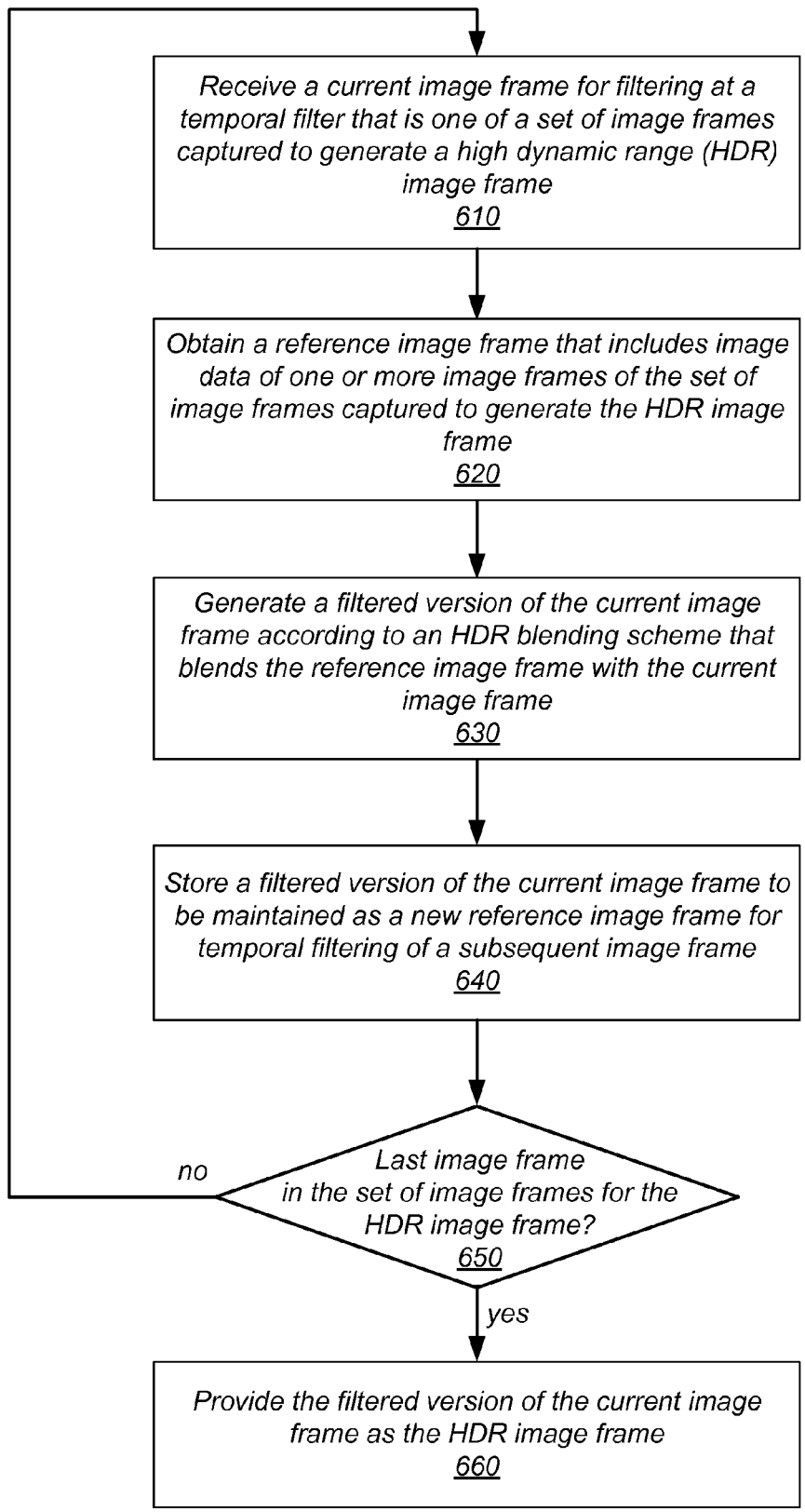
FIG. 6 is a high-level flowchart illustrating various methods and techniques for generating a HDR image using a temporal filter, according to some embodiments.

Please note that both the number of image frames used to generate an HDR image frame, as well as the ordering in which they are processed at a temporal filter as described in FIG. 5 are not intended to be limiting. For example, more or less image frames (at different exposure lengths/levels) may be captured to generate an HDR image, while the ordering may or may not proceed according to increasing or decreasing exposure lengths/levels for image frames. In some embodiments, multiple exposures at the same or similar exposure lengths may be captured and filtered together in order to reduce noise as well as generate an HDR image (e.g., 3 long exposures, 3 medium exposures, and 3 short exposures filtered together to generate an HDR image frame). More generally, FIG. 6 is a high-level flowchart illustrating various methods and techniques for generating a HDR image using a temporal filter, according to some embodiments.

As indicated at 610, a current image frame may be received for filtering at a temporal filtering module that is one of a set of image frames captured to generate an HDR image frame. Note that in various embodiments, image frames may be received as a stream of pixel data, which may be processed on a pixel by pixel basis. Thus, some or all of the various elements described below, including 610, 620, 630 and 640, may be performed with respect to each pixel in a received image frame. As indicated at 620, a reference image frame may be obtained that includes image data of one or more image frames of the set of image frames captured to generate the HDR image frame. The reference image frame may be maintained in a system memory or buffer and may be accessed for generating the filtered version of the current image frame. In some embodiments, as illustrated above in FIG. 5, the reference image frame may not have been previously filtered at the temporal filter module (e.g., if the reference image frame is the first image frame of the set of image frames for generating the HDR image frame). If, for example, more than two image frames are captured for generating an HDR image, then the reference image frame may be a filtered (and thus blended) version of two or more image frames that may include image data from the two or more image frames (e.g., as described above in FIG. 5 when short exposure image frame 506 is blended with the filtered version of medium exposure image frame 504 which includes image data from long exposure image frame 502.

As indicated at 630, a filtered version of the current image frame may be generated according to an HDR blending scheme that blends the reference image frame with the current image frame. As discussed above with regard to FIG. 5, an HDR blending scheme may be a scheme that blends image data from the reference image frame and the current image frame to combine the detail provided by different exposure times/levels for the different image frames in a single image frame. In some embodiments, the HDR blending scheme may generally prioritize blending more image data from frames with longer exposures, while increasing contributions of image data from short exposure frames when brightness values in the lower exposures reduce image details (e.g., exceed a brightness threshold such as a clip value).

Generating a filtered version of the current image frame may include many optimizations for performing temporal filtering. In some embodiments, brightness values for the pixels of the current image frame and the reference image frame may be adjusted to normalize brightness between the two image frames such that brightness values between the two image frames remain on par. When determining filters for pixels, various spatial filtering techniques may be applied to determine filter weights for blending pixels of the current image frame with corresponding pixels of the reference image frame (as described above with regard to FIGS. 4 and 5), in some embodiments. Filter weights may be adjusted, in some embodiments, according to noise history value maintained for pixels in the reference image frame. The reference image frame may be aligned to the current image frame according to a motion estimate determined with regard to the reference image frame and the current image frame (as discussed above with regard to FIGS. 4 and 5). Additionally, in some embodiments the HDR blending scheme may also be implemented to reduce or filter noise between image frames, whether of a similar or same exposure (e.g., between two medium exposure image frames) or different exposures (e.g., between a medium and a short image frame).

Once generated, the filtered version of the current image frame may be stored, in various embodiments, in order to be maintained as a new reference image frame for temporal filtering a subsequent image frame that is part of the set of image frames for generating the HDR image, as indicated at 640. If the image frame is the last image frame in the set of image frames for generating the HDR image frame, as indicated by the positive exit from 650, the filtered version of the current image frame may be provided as the HDR image frame, as indicated at 660. The HDR image frame may sent to subsequent components in an image processing pipeline (e.g., components in raw image processing unit 308, image format processing unit 310, output rescale unit 312, and/or output interface 314) for further processing. In some embodiments, the HDR image frame may be written to storage (e.g., system memory 130 in FIG. 1) to be maintained for subsequent access. If, the current image frame is not the last image frame, then in some embodiments, the various elements of FIG. 6 may be performed again for other image frame(s) in the set of image frames captured to generate the HDR image.

Please note that the techniques implemented in FIG. 6 may be implemented for processing a stream of image frames. For example, in some embodiments, alternating or repeating exposures of image frames (e.g., long exposure-short exposure or long exposure-medium exposure-short exposure) may be performed to generate a stream of HDR image frames processed at the image processing pipeline.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
    a camera configured to capture a plurality of image frames suitable for generation of a high dynamic range (HDR) image frame;
    an image signal processor comprising a temporal filter module, wherein the image signal processor is configured to:
        receive a current image frame for filtering at the temporal filter module, wherein the current image frame is one of the plurality of image frames captured by the camera;
        receive a reference image frame for the temporal filter module that comprises image data of one or more different image frames of the plurality of image frames captured by the camera, the reference image frame having a longer exposure than the current image frame;
        generate a normalized current image frame by applying digital gain to the current image frame in response to the longer exposure of the reference image frame relevant to the exposure of the current image frame;
        generate a filtered version of the current image frame according to an HDR blending scheme for the plurality of images that blends the reference image frame with the normalized current image frame;
        determine that the current image frame is last of the plurality of image frames to be filtered; and
        in response to the determination that the current image frame is the last of the plurality of image frames to be filtered, provide the filtered version of the current image frame as the HDR image frame.

2. The apparatus of claim 1, wherein to generate the filtered version of the current image frame, the image signal processor is configured to:
    determine a motion estimate for the reference image frame with regard to the current image frame; and
    align the reference image frame to the current image frame according to the determined motion estimate.

3. The apparatus of claim 1, wherein to generate the filtered version of the current image frame, the image signal processor is configured to:
    determine a respective filter weight for each pixel in the current image frame, wherein the determination comprises application of one or more spatial filtering techniques to determine a difference between a given pixel of the current image frame and a corresponding pixel of the reference image frame; and
    blend each pixel in the current image frame with the corresponding pixel in the reference image frame according to the respective filter weight for the pixel.

4. The apparatus of claim 1, wherein the apparatus comprises a mobile computing device.

5. A method, comprising:
    receiving, by an image signal processor, a current image frame for filtering at a temporal filter module, wherein the current image frame is one of plurality of image frames captured to generate a high dynamic range (HDR) image frame;
    obtaining, by the image signal processor, a reference image frame for the temporal filter module that comprises image data of one or more different image frames of the plurality of image frames captured to generate the HDR image frame, the reference image frame having a longer exposure relative to the exposure of the current image frame;
    generating a normalized current image frame by applying digital gain to the current image frame in response to the longer exposure of the reference image frame relevant to the exposure of the current image frame;
    generating, by the image signal processor, a filtered version of the current image frame according to an HDR blending scheme for the plurality of images that blends the reference image frame with the normalized current image frame;

determining, by the image signal processor, that the current image frame is last of the plurality of image frames to be filtered; and in response to determining that the current image frame is the last of the plurality of image frames to be filtered, providing, by the image signal processor, the filtered version of the current image frame as the HDR image frame.

6. The method of claim 5, wherein the generating the filtered version of the current image frame comprises applying one or more resealing techniques to least one of the current image frame and the reference image frame.

7. The method of claim 5, wherein generating the filtered version of the current image frame comprises:
determining a motion estimate for the reference image frame to register the reference image frame with regard to the current image frame; and
aligning the reference image frame to the current image frame according to the determined motion estimate.

8. The method of claim 5, wherein generating the filtered version of the current image frame comprises:
determining a respective filter weight for each pixel in the current image frame, wherein the determining comprises applying one or more spatial filtering techniques to determine a difference between a given pixel of the current image frame and a corresponding pixel of the reference image frame; and
blending each pixel in the current image frame with the corresponding pixel in the reference image frame according to the respective filter weight for the pixel.

9. The method of claim 5, wherein generating the filtered version of the current image frame further comprises:
modifying the respective filter weight determined for each pixel in the current image frame according to a respective noise history maintained for the corresponding pixel of the reference image frame, wherein each pixel of the current image frame is blended according to the modified respective filter weight.

10. The method of claim 5, wherein the one or more different image frames includes at least one previously filtered image frame of the plurality of image frames captured to generate the HDR image frame, and wherein the receiving, the obtaining, and the generating were performed with respect to the at least one previously filtered image frame.

11. The method of claim 5, wherein the plurality of image frames that are captured to generate the HDR image frame are part of a stream of image frames for generating different respective HDR image frames such that a video stream of HDR image frames is provided by the image signal processor.

12. The method of claim 5, wherein the image signal processor is implemented as part of a mobile computing device.

13. A system, comprising:
a device configured to perform image processing, the device comprising:
a sensor interface configured to receive image data from an image sensor; and
an image processing pipeline comprising a temporal filter module, the image processing pipeline configured to:
receive a current image frame for filtering at the temporal filter module, wherein the current image frame is one of plurality of image frames captured to generate a high dynamic range (HDR) image frame;
obtain a reference image frame for filtering at the temporal filter module, wherein the reference image frame comprises image data of one or more different image frames of the plurality of image frames captured to generate the HDR image frame, the reference image frame having a longer exposure relative to the exposure of the current image frame;
generate a normalized current image frame by applying digital gain to the current image frame in response to the longer exposure of the reference image frame relevant to the exposure of the current image frame;
generate a filtered version of the current image frame according to an HDR blending scheme for the plurality of images that blends the reference image frame with the normalized current image frame;
determine that the current image frame is last of the plurality of image frames to be filtered; and
in response to the determination that the current image frame is the last of the plurality of image frames to be filtered, provide the filtered version of the current image frame as the HDR image frame.

14. The system of claim 13, wherein to generate the filtered version of the current image frame, the image processing pipeline is configured to apply one or more scaling algorithms to at least one of current image frame and the reference image frame.

15. The system of claim 13, wherein to generate the filtered version of the current image frame, the image processing pipeline is configured to:
determine a motion estimate for the reference image frame to register the reference image frame with regard to the current image frame; and
align the reference image frame to the current image frame according to the determined motion estimate.

16. The system of claim 13, wherein to generate the filtered version of the current image frame, the image processing pipeline is configured to:
determine a respective filter weight for each pixel in the current image frame, wherein the determination comprises application of one or more spatial filtering techniques to determine a difference between a given pixel of the current image frame and a corresponding pixel of the reference image frame; and
blend each pixel in the current image frame with the corresponding pixel in the reference image frame according to the respective filter weight for the pixel.

17. The system of claim 16, wherein the current image frame and the reference image frame are formatted according to a Bayer image filter.

18. The system of claim 13, wherein the one or more different image frames includes at least one image frame of the plurality of image frames captured to generate the HDR image frame that was not filtered at the temporal filter module.

19. The system of claim 13, wherein the system is a mobile computing device, and wherein the device is an image signal processor.

20. The apparatus of claim 1, wherein generating a filtered version of the current image frame according to an HDR blending scheme comprises:

for one or more particular pixel locations of the normalized current image frame:
  if a brightness value of the particular pixel location in the reference image frame is greater than or equal to a clipping threshold, setting the brightness of the particular pixel location in the filtered version of the current image frame to be equal to the brightness of the particular pixel location in the normalized current image frame;
  if a brightness value of the particular pixel location in the normalized current image frame is lower than or equal to a noise threshold, setting the brightness of the particular pixel location in the filtered version of the current image frame to be equal to the brightness of the particular pixel location in the reference image frame;
  if the brightness value of the particular pixel location in the reference image frame is less than the clipping threshold and the brightness value of the particular pixel location in the normalized current image frame is greater than the noise threshold:
  calculating an average pixel brightness of the particular pixel location by averaging the brightness of the particular pixel location in the normalized current image frame with the brightness of the particular pixel location in the reference image frame; and
  setting the brightness of the particular pixel location in the filtered version of the current image frame using a weighted blend of the brightness value of the particular pixel location in the normalized current image frame and the brightness value of the particular pixel location in the reference image frame, wherein the weighting is determined at least in part in response to the calculated average pixel brightness of the particular pixel location.

* * * * *

UNITED STATES PATENT AND TRADEMARK OFFICE
CERTIFICATE OF CORRECTION

PATENT NO.         : 9,479,695 B2                                    Page 1 of 1
APPLICATION NO.    : 14/449015
DATED              : October 25, 2016
INVENTOR(S)        : Suk Hwan Lim et al.

It is certified that error appears in the above-identified patent and that said Letters Patent is hereby corrected as shown below:

On the Title Page

In Item (57):

Abstract, Line 3, please delete "frame be" and substitute --frame may be--.

Signed and Sealed this
Third Day of January, 2017

Michelle K. Lee
*Director of the United States Patent and Trademark Office*